(12) United States Patent
Hasegawa et al.

(10) Patent No.: US 10,927,213 B2
(45) Date of Patent: Feb. 23, 2021

(54) PRODUCING METHOD OF POLYURETHANE RESIN, POLYURETHANE RESIN, AND MOLDED ARTICLE

(71) Applicant: MITSUI CHEMICALS, INC., Tokyo (JP)

(72) Inventors: Daisuke Hasegawa, Yokohama (JP); Hiroaki Tago, Chiba (JP); Masakazu Kageoka, Kawasaki (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 118 days.

(21) Appl. No.: 16/348,349

(22) PCT Filed: Nov. 14, 2017

(86) PCT No.: PCT/JP2017/040837
§ 371 (c)(1),
(2) Date: May 8, 2019

(87) PCT Pub. No.: WO2018/092745
PCT Pub. Date: May 24, 2018

(65) Prior Publication Data
US 2020/0055976 A1    Feb. 20, 2020

(30) Foreign Application Priority Data

Nov. 17, 2016  (JP) .............................. JP2016-224421
Apr. 21, 2017  (JP) .............................. JP2017-084659

(51) Int. Cl.
| C08G 18/75 | (2006.01) |
| C08G 18/22 | (2006.01) |
| C08G 18/65 | (2006.01) |
| C08G 18/82 | (2006.01) |
| C08G 18/10 | (2006.01) |
| C08G 18/66 | (2006.01) |
| C08G 18/48 | (2006.01) |
| C08G 18/42 | (2006.01) |
| C08G 18/24 | (2006.01) |
| C08G 18/16 | (2006.01) |
| C08L 75/04 | (2006.01) |
| C08G 18/32 | (2006.01) |

(52) U.S. Cl.
CPC ........... *C08G 18/757* (2013.01); *C08G 18/10* (2013.01); *C08G 18/168* (2013.01); *C08G 18/227* (2013.01); *C08G 18/242* (2013.01); *C08G 18/4277* (2013.01); *C08G 18/4808* (2013.01); *C08G 18/4833* (2013.01); *C08G 18/65* (2013.01); *C08G 18/664* (2013.01); *C08G 18/752* (2013.01); *C08G 18/82* (2013.01); *C08L 75/04* (2013.01); *C08G 18/3206* (2013.01); *C08G 18/4854* (2013.01)

(58) Field of Classification Search
CPC .... C08G 18/757; C08G 18/227; C08G 18/65; C08G 18/82; C08G 18/10; C08G 18/664; C08G 18/4833; C08G 18/4808; C08G 18/4277; C08G 18/242; C08G 18/168; C08G 18/752; C08G 18/3206; C08G 18/4854; C08L 75/04
See application file for complete search history.

(56) References Cited

U.S. PATENT DOCUMENTS

| 2009/0036630 A1 | 2/2009 | Sasano et al. |
| 2010/0222442 A1 | 9/2010 | Prissok |
| 2012/0220724 A1 | 8/2012 | Mullick |
| 2012/0329892 A1 | 12/2012 | Prissok |
| 2015/0051328 A1 | 2/2015 | Ye |
| 2015/0342276 A1 | 12/2015 | Yamasaki et al. |
| 2018/0020841 A1* | 1/2018 | Mitsuzuka ............. A47C 31/00 5/737 |
| 2018/0319981 A1* | 11/2018 | Henze ................ C08G 18/0895 |

FOREIGN PATENT DOCUMENTS

| CN | 102558830 A | 7/2012 |
| JP | H06049409 A | 2/1994 |
| JP | H10218962 A | 8/1998 |
| JP | 2002535468 A | 10/2002 |
| JP | 2007238958 A | 9/2007 |

(Continued)

OTHER PUBLICATIONS

International Search Report dated Jan. 9, 2018 filed in PCT/JP2017/040837.

(Continued)

*Primary Examiner* — Patrick D Niland
(74) *Attorney, Agent, or Firm* — Rankin, Hill & Clark LLP

(57) ABSTRACT

A method for producing a polyurethane resin includes a reaction step of obtaining a primary product by reacting a polyisocyanate component containing a bis(isocyanatomethyl)cyclohexane with a polyol component containing a low molecular weight polyol having a number average molecular weight of 400 or less and a high molecular weight polyol having an average molecular weight of 2500 or more and 4000 or less under the presence of a bismuth catalyst, and a heat treatment step of heat treating the primary product to obtain a polyurethane resin. The bismuth catalyst content in the polyurethane resin is 0.1 ppm or more and 1000 ppm or less, and the heat treatment conditions in the heat treatment step are 50° C. or more and 100° C. or less and three days or more and ten days or less.

4 Claims, 1 Drawing Sheet

(56) References Cited

FOREIGN PATENT DOCUMENTS

| JP | 2010513596 A | 4/2010 |
| JP | 2011012141 A | 1/2011 |
| JP | 2013023656 A | 2/2013 |
| WO | 0044821 A1 | 8/2000 |
| WO | 2005026243 A1 | 3/2005 |
| WO | 2007082838 A1 | 7/2007 |
| WO | 2015017088 A1 | 2/2015 |
| WO | 2015017089 A1 | 2/2015 |
| WO | 2015017090 A1 | 2/2015 |
| WO | 2016152545 A1 | 9/2016 |

OTHER PUBLICATIONS

Extended European Search Report (EESR) dated Apr. 20, 2020 issued in the corresponding European Patent Application No. 17870773.3.

PCT International Preliminary Report on Patentability (Form PCT/IB/373) filed in PCT/JP2017/040837, with PCT Notification Concerning Transmittal of International Preliminary Report on Patentability (Form PCT/IB/326) dated May 31, 2019.

PCT International Preliminary Report on Patentability (Form PCT/IB/373) filed in PCT/JP2017/040837, with PCT Notification of Transmittal of Translation of the International Preliminary Report on Patentability (Form PCT/IB/338) dated May 31, 2019.

* cited by examiner

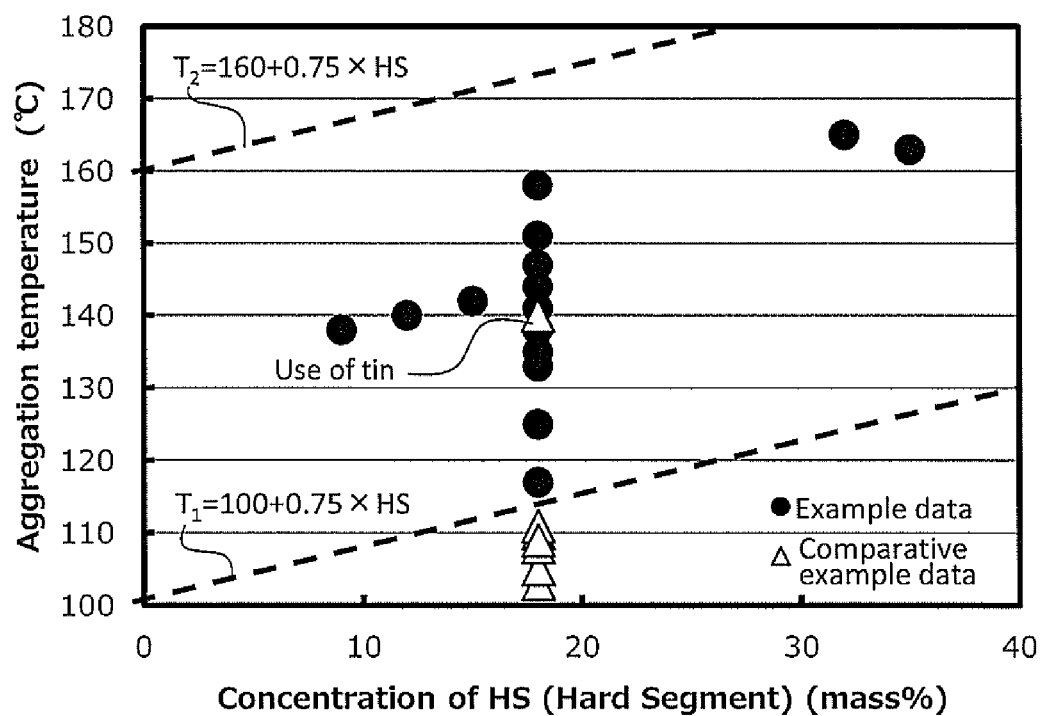

ent invention is to provide a method
PRODUCING METHOD OF POLYURETHANE RESIN, POLYURETHANE RESIN, AND MOLDED ARTICLE

TECHNICAL FIELD

The present invention relates to a method for producing a polyurethane resin, a polyurethane resin, and a molded article.

BACKGROUND ART

A thermoplastic polyurethane resin (TPU) is generally a rubber elastic body obtained by reaction of a polyisocyanate, a high molecular weight polyol, and a low molecular weight polyol, and includes a hard segment formed by reaction of the polyisocyanate and the low molecular weight polyol and a soft segment formed by reaction of the polyisocyanate and the high molecular weight polyol. The thermoplastic polyurethane resin is melted and molded, so that a molded article prepared from a polyurethane resin can be obtained.

In the production of the polyurethane resin, as a urethane-formation catalyst, a tin catalyst is usually used. Recently, however, in view of working environment or the like, it has been considered that the tin catalyst is reduced, and a bismuth catalyst is used instead of the tin catalyst.

To be specific, for example, it has been proposed that a 1,4-bis(isocyanatomethyl)cyclohexane having a trans/cis ratio of 86/14 reacts with a polytetramethylene ether glycol having a number average molecular weight of 1800 to 2000, so that an isocyanate group-terminated polyurethane prepolymer is synthesized; and the isocyanate group-terminated polyurethane prepolymer reacts with a 1,4-butanediol under the presence of a bismuth neodecanoate (catalyst) at 150° C. for one hour and at 100° C. for 23 hours to be aged at 23° C. for seven days, thereby producing a polyurethane elastomer. Also, it has been proposed that the polyurethane elastomer is melted and molded, so that a molded article is obtained (ref: for example, Patent Document 1 (Synthetic Example 1, Example 1)).

CITATION LIST

Patent Document

Patent Document 1: Japanese Unexamined Patent Publication No. 2013-23656

SUMMARY OF THE INVENTION

Problem to be Solved by the Invention

Meanwhile, the molded article of the polyurethane elastomer is required to have mechanical properties, and the molded article obtained by using the bismuth catalyst may not have sufficient mechanical properties compared to that obtained by using the tin catalyst.

In the industrial production, a large-scale molding machine may be used, so that a retention time in a heating state may be relatively long. In the industrial production, when the polyurethane elastomer having insufficient heat resistance is used, there may be a case where the mechanical properties of the molded article to be obtained are poor, or a molding failure such as fish eye occurs. Thus, in the industrial production of the molded article, the development of the properties without depending on the molding conditions, that is, the molding stability in the industrial production is required.

An object of the present invention is to provide a method for producing a polyurethane resin in which when a bismuth catalyst is used, a polyurethane resin having excellent mechanical properties and having excellent molding stability can be produced; a polyurethane resin; and furthermore, a molded article obtained from the polyurethane resin.

Means for Solving the Problem

The present invention [1] includes a method for producing a polyurethane resin including a reaction step of obtaining a primary product by reacting a polyisocyanate component containing a bis(isocyanatomethyl)cyclohexane with a polyol component containing a low molecular weight polyol having a number average molecular weight of 400 or less and a high molecular weight polyol having an average molecular weight of 2500 or more and 4000 or less under the presence of a bismuth catalyst, and a heat treatment step of heat treating the primary product to obtain a polyurethane resin, wherein the bismuth catalyst content in the polyurethane resin is 0.1 ppm or more and 1000 ppm or less, and the heat treatment conditions in the heat treatment step are 50° C. or more and 100° C. or less and three days or more and ten days or less.

The present invention [2] includes the method for producing a polyurethane resin described in the above-described [1], wherein the bis(isocyanatomethyl)cyclohexane is a 1,4-bis(isocyanatomethyl)cyclohexane, and the 1,4-bis(isocyanatomethyl)cyclohexane contains a trans-isomer at a ratio of 70 mol % or more and 99 mol % or less.

The present invention [3] includes a polyurethane resin being a reaction product of a polyisocyanate component containing a 1,4-bis(isocyanatomethyl)cyclohexane with a polyol component containing a low molecular weight polyol having a number average molecular weight of 400 or less and a high molecular weight polyol having a number average molecular weight of 2500 or more and 4000 or less; the bismuth catalyst content is 0.1 ppm or more and 1000 ppm or less; and an aggregation temperature thereof measured with a differential scanning calorimeter is an aggregation temperature $T_1$ or more of a hard segment phase shown by the following calculation formula and an aggregation temperature $T_2$ or less of a hard segment phase shown by the following calculation formula.

Aggregation temperature $T_1$ of hard segment phase (unit: ° C.): 100+0.75×concentration of hard segment (mass %)

Aggregation temperature $T_2$ of hard segment phase (unit: ° C.): 160+0.75×concentration of hard segment (mass %)

The present invention [4] includes a molded article containing the polyurethane resin described in the above-described [3].

Effect of the Invention

In a method for producing a polyurethane resin of the present invention, a polyisocyanate component containing a bis(isocyanatomethyl)cyclohexane reacts with a polyol component containing a low molecular weight polyol having a number average molecular weight of 400 or less and a high molecular weight polyol having a number average molecular weight of 2500 or more and 4000 or less under the presence of a bismuth catalyst, and a primary product to be obtained is heat treated under the predetermined conditions.

Thus, a polyurethane resin of the present invention obtained by the method for producing a polyurethane resin of the present invention, and furthermore, a molded article of the present invention containing the polyurethane resin have excellent molding stability, and have excellent mechanical properties even though a bismuth catalyst is used.

BRIEF DESCRIPTION OF THE DRAWINGS

FIG. 1 shows a distribution diagram illustrating an aggregation temperature of each polyurethane resin of Examples and Comparative Examples.

DESCRIPTION OF EMBODIMENTS

In a method for producing a polyurethane resin of the present invention, as described later, a polyisocyanate component reacts with a polyol component to be then heat treated (heat aged), thereby producing a thermoplastic polyurethane resin.

In other words, the polyurethane resin is a reaction product of the polyisocyanate component with the polyol component.

The polyisocyanate component contains a bis(isocyanatomethyl)cyclohexane as an essential component.

Examples of the bis(isocyanatomethyl)cyclohexane include 1,3-bis(isocyanatomethyl)cyclohexane and 1,4-bis(isocyanatomethyl)cyclohexane. Preferably, in view of symmetrical structure, and improvement of mechanical properties and molding stability of the polyurethane resin, a 1,4-bis(isocyanatomethyl)cyclohexane is used.

The 1,4-bis(isocyanatomethyl)cyclohexane includes a stereoisomer of cis-1,4-bis(isocyanatomethyl)cyclohexane (hereinafter, referred to as a cis-1,4 isomer) and trans-1,4-bis(isocyanatomethyl)cyclohexane (hereinafter, referred to as a trans-1,4 isomer). In the present invention, the 1,4-bis(isocyanatomethyl)cyclohexane contains the trans-1,4 isomer at a ratio of, for example, 60 mol % or more, preferably 70 mol % or more, more preferably 80 mol % or more, further more preferably 85 mol % or more, and for example, 99.8 mol % or less, preferably 99 mol % or less, more preferably 96 mol % or less, further more preferably, 90 mol % or less. In other words, in the 1,4-bis(isocyanatomethyl)cyclohexane, the total amount of the trans-1,4 isomer and the cis-1,4 isomer is 100 mol %, so that the cis-1,4 isomer is contained at a ratio of, for example, 0.2 mol % or more, preferably 1 mol % or more, more preferably 4 mol % or more, further more preferably 10 mol % or more, and for example, 40 mol % or less, preferably 30 mol % or less, more preferably 20 mol % or less, further more preferably 15 mol % or less.

When the content ratio of the trans-1,4 isomer is the above-described lower limit or more, the molding stability can be improved. When the content ratio of the trans-1,4 isomer is the above-described upper limit or less, the mechanical properties such as tear strength, breaking strength, and breaking elongation, and the molding stability can be improved.

The bis(isocyanatomethyl)cyclohexane can be produced from, for example, a commercially available bis(aminomethyl)cyclohexane and a bis(aminomethyl)cyclohexane obtained by a method described in Japanese Unexamined Patent Publication No. 2011-6382 by, for example, a heat and cold two-step phosgenation method (direct method) and a salification method described in Japanese Unexamined Patent Publication No. H7-309827 and Japanese Unexamined Patent Publication No. 2014-55229, and a non-phosgenation method described in Japanese Unexamined Patent Publication No. 2004-244349 and Japanese Unexamined Patent Publication No. 2003-212835.

The bis(isocyanatomethyl)cyclohexane can be also prepared as a modified product as long as the excellent effect of the present invention is not damaged.

Examples of the modified product of the bis(isocyanatomethyl)cyclohexane include multimers of the bis(isocyanatomethyl)cyclohexane (dimer (for example, uretodione modified product or the like), trimer (for example, isocyanurate modified product, iminooxadiazinedione modified product, or the like), or the like); biuret modified products (for example, biuret modified product or the like produced by reaction of the bis(isocyanatomethyl)cyclohexane with water); allophanate modified products (for example, allophanate modified product or the like produced by reaction of the bis(isocyanatomethyl)cyclohexane with a monohydric alcohol or a dihydric alcohol); polyol modified products (for example, polyol modified product (adduct) or the like produced by reaction of the bis(isocyanatomethyl)cyclohexane with a trihydric alcohol); oxadiazine trione modified products (for example, oxadiazine trione or the like produced by reaction of the bis(isocyanatomethyl)cyclohexane with a carbonic acid gas); and carbodiimide modified products (for example, carbodiimide modified product or the like produced by decarboxylation condensation reaction of the bis(isocyanatomethyl)cyclohexane).

The polyisocyanate component can also contain another polyisocyanate such as an aliphatic polyisocyanate, an aromatic polyisocyanate, and an araliphatic polyisocyanate as an optional component as long as the excellent effect of the present invention is not damaged.

Examples of the aliphatic polyisocyanate include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyl octane, 2,5,7-trimethyl-1,8-diisocyanate-5-isocyanatomethyl octane, bis(isocyanatoethyl)carbonate, bis(isocyanatoethyl)ether, 1,4-butylene glycol dipropylether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol, and 2,6-diisocyanatemethylcaproate.

An example of the aliphatic polyisocyanate includes an alicyclic polyisocyanate (excluding the bis(isocyanatomethyl)cyclohexane).

Examples of the alicyclic polyisocyanate (excluding the bis(isocyanatomethyl)cyclohexane) include isophorone diisocyanate (IPDI), trans-trans-, trans-cis-, and cis-cis-dicyclohexylmethane diisocyanate and a mixture thereof (hydrogenated MDI), 1,3- or 1,4-cyclohexane diisocyanate and a mixture thereof, 1,3- or 1,4-bis(isocyanatoethyl)cyclohexane, methylcyclohexane diisocyanate, 2,2'-dimethyldicyclohexylmethane diisocyanate, dimer acid diisocyanate, 2,5-diisocyanatomethylbicyclo [2,2,1]-heptane, 2,6-diisocyanatomethylbicyclo [2,2,1]-heptane (NBDI) that is an isomer thereof, 2-isocyanatomethyl-2-(3-isocyanatopropyl)-5-isocyanatomethylbicyclo-[2,2,1]-heptane, 2-isocyanatomethyl-2-(3-isocyanatopropyl)-6-isocyanatomethylbicyclo-

[2,2,1]-heptane, 2-isocyanatomethyl-3-(3-isocyanatopropyl)-5-(2-isocyanatoethyl)-bicyclo-[2,2,1]-heptane. 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, and 2-isocyanatomethyl-2-(3-isocyanatopropyl)-6-(2-isocyanatoethyl)-bicyclo-[2,2,1]-heptane.

Examples of the aromatic polyisocyanate include 2,4-tolylene diisocyanate, 2,6-tolylene diisocyanate, and an isomer mixture of the tolylene diisocyanate (TDI); 4,4'-diphenylmethane diisocyanate, 2,4'-diphenylmethane diisocyanate, 2,2'-diphenylmethane diisocyanate, and an optional isomer mixture of the diphenylmethane diisocyanate (MDI); toluidine diisocyanate (TODI); paraphenylene diisocyanate; and naphthalene diisocyanate (NDI).

Examples of the araliphatic polyisocyanate include 1,3- or 1,4-xylylene diisocyanate and a mixture thereof (XDI), and 1,3- or 1,4-tetramethylxylylene diisocyanate and a mixture thereof (TMXDI).

These other polyisocyanates can be used alone or in combination of two or more.

The other polyisocyanate can be also prepared as a modified product as long as the excellent effect of the present invention is not damaged.

Examples of the modified product of the other polyisocyanate include multimers (dimer, trimer, or the like), biuret modified products, allophanate modified products, polyol modified products, oxadiazinetrione modified products, and carbodiimide modified products of the other polyisocyanate.

The content ratio of the other polyisocyanate with respect to the total amount of the polyisocyanate component is, for example, 50 mass % or less, preferably 30 mass % or less, more preferably 20 mass % or less.

The polyisocyanate component can contain a monoisocyanate as an optional component as long as the excellent effect of the present invention is not damaged.

Examples of the monoisocyanate include methyl isocyanate, ethyl isocyanate, n-hexyl isocyanate, cyclohexyl isocyanate, 2-ethylhexyl isocyanate, phenyl isocyanate, and benzyl isocyanate.

The content ratio of the monoisocyanate with respect to the total amount of the polyisocyanate component is, for example, 20 mass % or less, preferably 10 mass % or less.

As the polyisocyanate component, preferably, a bis(isocyanatomethyl)cyclohexane is used alone. That is, the polyisocyanate component preferably consists of a bis(isocyanatomethyl)cyclohexane, more preferably consists of a 1,4-bis(isocyanatomethyl)cyclohexane.

In the present invention, as the polyol component, a compound having two or more hydroxyl groups in a molecule and having a molecular weight of 50 or more and 5000 or less is used.

The polyol component contains a low molecular weight polyol having a molecular weight of 400 or less and a high molecular weight polyol having a molecular weight of 2500 or more and 4000 or less. Preferably, the polyol component consists of a low molecular weight polyol having a molecular weight of 400 or less and a high molecular weight polyol having a molecular weight of 2500 or more and 4000 or less.

When a high molecular weight compound is contained in the polyol component, as the molecular weight of the high molecular weight compound, a number average molecular weight is used. In such a case, the number average molecular weight can be determined with measurement by a GPC method, and a hydroxyl value and formulation of each of the components constituting the high molecular weight compound (hereinafter, the same).

An example of the low molecular weight polyol includes a compound (monomer) having two or more hydroxyl groups in a molecule and having a molecular weight of 50 or more and 400 or less. To be specific, examples of the low molecular weight polyol include polyhydric alcohols including dihydric alcohols such as C2-C4 alkanediol including ethylene glycol, 1,3-propylene glycol, 1,2-propylene glycol, 1,4-buthylene glycol (1,4-butane diol, 1,4-BD), 1,3-butylene glycol, and 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, another C7 to C11 alkanediol, cyclohexanedimethanol (1,3- or 1,4-cyclohexanedimethanol and a mixture thereof), cyclohexanediol (1,3- or 1,4-cyclohexanediol and a mixture thereof), 1,4-dihydroxy-2-butene, 2,6-dimethyl-1-octene-3,8-diol, diethylene glycol, triethylene glycol, dipropylene glycol, 1,2-benzenediol (also known as catechol), 1,3-benzenediol, 1,4-benzenediol, bisphenol A, and hydrogenated product thereof; trihydric alcohols such as glycerin, trimethylol propane, and triisopropanolamine; and tetrahydric alcohols such as tetramethylolmethane (pentaerythritol) and diglycerin.

These low molecular weight polyols can be used alone or in combination of two or more.

As the low molecular weight polyol, preferably, a dihydric alcohol is used, more preferably, a C2 to C4 alkanediol is used, further more preferably, a 1,4-butanediol is used.

When the low molecular weight polyol is the above-described polyol, a molded article (described later) having excellent mechanical properties such as breaking strength can be obtained.

The number average molecular weight of the low molecular weight polyol is, for example, 50 or more, preferably 70 or more, and for example, 400 or less, preferably, 300 or less.

When the molecular weight of the low molecular weight polyol is within the above-described range, a molded article (described later) having excellent mechanical properties can be obtained.

As the high molecular weight polyol, for example, a high molecular weight compound (preferably, a polymer) having a number average molecular weight of 2500 or more and 4000 or less and having two or more hydroxyl groups in a molecule is used.

To be specific, examples of the high molecular weight polyol include polyether polyol, polyester polyol, polycarbonate polyol, vegetable oil polyol, polyolefin polyol, and acrylic polyol.

Examples of the polyether polyol include polyoxyalkylene polyol and polytetramethylene ether polyol.

The polyoxyalkylene polyol is, for example, an addition polymer of an alkylene oxide with the above-described low molecular weight polyol and a known low molecular weight polyamine as an initiator.

Examples of the alkylene oxide include propylene oxide, ethylene oxide, and butylene oxide. These alkylene oxides can be used alone or in combination of two or more. Among these, preferably, a propylene oxide and an ethylene oxide are used. An example of the polyoxyalkylene polyol includes a polyethylene glycol, a polypropylene glycol, and a random and/or block copolymer of a propylene oxide and an ethylene oxide.

An example of the polytetramethylene ether polyol includes a ring-opening polymer (polytetramethylene ether glycol) obtained by cationic polymerization of tetrahydrofuran and an amorphous (noncrystalline) polytetramethylene ether glycol that copolymerizes an alkyl-substituted tetrahydrofuran or the above-described dihydric alcohol with a polymerization unit of tetrahydrofuran.

The amorphous (noncrystalline) is defined as a state of being liquid at a normal temperature (25° C.) (hereinafter, the same).

An example of the polyester polyol includes a polycondensate obtained by allowing the above-described low molecular weight polyol to react with a polybasic acid under known conditions.

Examples of the polybasic acid include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, and other saturated aliphatic dicarboxylic acids (carbon number of 11 to 13); unsaturated aliphatic dicarboxylic acids such as maleic acid, fumaric acid, itaconic acid, and others; aromatic dicarboxylic acids such as orthophthalic acid, isophthalic acid, terephthalic acid, toluene dicarboxylic acid, naphthalene dicarboxylic acid, and others; alicyclic dicarboxylic acids such as hexahydrophthalic acid and others; other carboxylic acids such as dimer acid, hydrogenated dimer acid, HET acid, and others; anhydrides derived from the carboxylic acids such as oxalic anhydrides, succinic anhydrides, maleic anhydrides, phthalic anhydrides, 2-alkyl (C12 to C18) succinic anhydrides, tetrahydrophthalic anhydrides, and trimellitic anhydrides; and furthermore, acid halides derived from the carboxylic acids such as oxalyl dichlorides, adipic acid dichlorides, and sebacic acid dichlorides.

An example of the polyester polyol includes a polyester polyol derived from plants, to be specific, a plant oil-based polyester polyol obtained by subjecting a hydroxy carboxylic acid such as hydroxyl group-containing vegetable oil fatty acid (for example, castor oil fatty acid containing a ricinoleic acid, hydrogenated castor oil fatty acid containing a 12-hydroxystearic acid, or the like) to condensation reaction under known conditions with the above-described low molecular weight polyol as an initiator.

Examples of the polyester polyol include a lactone-based polyester polyol including a polycaprolactone polyol and a polyvalerolactone polyol obtained by subjecting lactones such as ε-caprolactone and γ-valerolactone and lactides such as L-lactide and D-lactide to ring-opening polymerization with the above-described low molecular weight polyol (preferably, dihydric alcohol) as the initiator, and furthermore, a copolymer of these with the above-described dihydric alcohol.

Examples of the polycarbonate polyol include a ring-opening polymer of ethylene carbonate with the above-described low molecular weight polyol (preferably, the above-described dihydric alcohol) as an initiator and an amorphous polycarbonate polyol obtained by copolymerizing the dihydric alcohols such as 1,4-butanediol, 1,5-pentanediol, 3-methyl-1,5-pentanediol, and 1,6-hexanediol with the ring-opening polymer.

Examples of the vegetable oil polyol include hydroxyl group-containing vegetable oils such as castor oil and coconut oil. Also, examples thereof include a castor oil polyol and an ester-modified castor oil polyol obtained by allowing a castor oil fatty acid to react with a polypropylene polyol.

Examples of the polyolefin polyol include a polybutadiene polyol and a partially saponified ethylene-vinyl acetate copolymer.

An example of the acrylic polyol includes a copolymer obtained by copolymerizing a hydroxyl group-containing acrylate with a copolymerizable vinyl monomer that is copolymerizable with the hydroxyl group-containing acrylate.

Examples of the hydroxyl group-containing acrylate include 2-hydroxyethyl (meth)acrylate, hydroxypropyl (meth)acrylate, hydroxybutyl (meth)acrylate, 2,2-dihydroxymethylbutyl (meth)acrylate, polyhydroxyalkyl maleate, and polyhydroxyalkyl fumarate. Preferably, a 2-hydroxyethyl (meth)acrylate is used.

Examples of the copolymerizable vinyl monomer include alkyl (meth)acrylates (carbon number of 1 to 12) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, and cyclohexyl acrylate; aromatic vinyls such as styrene, vinyltoluene, and α-methylstyrene; vinyl cyanides such as (meth)acrylonitrile; vinyl monomers containing a carboxyl group such as (meth)acrylic acid, fumaric acid, maleic acid, and itaconic acid or alkyl esters thereof; alkanepolyol poly(meth)acrylates such as ethyleneglycol di(meth)acrylate, butyleneglycol di(meth)acrylate, hexanediol di(meth)acrylate, and oligoethyleneglycol di(meth)acrylate; and vinyl monomers containing an isocyanate group such as 3-(2-isocyanate-2-propyl)-α-methylstyrene.

The acrylic polyol can be obtained by copolymerizing the hydroxyl group-containing acrylate with the copolymerizable vinyl monomer under the presence of an appropriate solvent and a polymerization initiator.

Examples of the acrylic polyol include a silicone polyol and a fluorine polyol.

An example of the silicone polyol includes an acrylic polyol in which a silicone compound containing a vinyl group such as γ-methacryloxypropyltrimethoxysilane is blended as a copolymerizable vinyl monomer in the copolymerization of the above-described acrylic polyol.

An example of the fluorine polyol includes an acrylic polyol in which a fluorine compound containing a vinyl group such as tetrafluoroethylene and chlorotrifluoroethylene is blended as a copolymerizable vinyl monomer in the copolymerization of the above-described acrylic polyol.

These high molecular weight polyols can be used alone or in combination of two or more.

As the high molecular weight polyol, preferably, a polyether polyol and a polyester polyol are used, more preferably, a polyethylene glycol, a polytetramethylene ether glycol, and a polycaprolactone polyol are used.

When the high molecular weight polyol is the above-described polyol, a molded article (described later) having excellent mechanical properties such as breaking strength and tear strength can be obtained.

The number average molecular weight of the high molecular weight polyol is, as described above, for example, 2500 or more, preferably 2700 or more, more preferably 2800 or more, further more preferably 2900 or more, and as described above, for example, 4000 or less, preferably 3500 or less, more preferably 3200 or less.

When the molecular weight of the high molecular weight polyol is below the above-described lower limit, there is a disadvantage that the mechanical properties such as breaking elongation, compression permanent set, and residual strain are poor, the properties easily change according to the molding conditions, and furthermore, a molding failure such as fish eye easily occurs.

When the molecular weight of the high molecular weight polyol is above the above-described upper limit, there is a disadvantage that the mechanical properties such as tear strength and breaking strength are poor, the properties easily change according to the molding conditions, and furthermore, a molding failure such as fish eye easily occurs.

Meanwhile, when the molecular weight of the high molecular weight polyol is within the above-described range, excellent mechanical properties can be developed.

In the polyol component, as the content ratio of the low molecular weight polyol and the high molecular weight polyol, the ratio of the high molecular weight polyol with respect to the total amount of these is, for example, 5 mol % or more, preferably 7 mol % or more, more preferably 10 mol % or more, further more preferably 15 mol % or more, and for example, 75 mol % or less, preferably 65 mol % or less, more preferably 50 mol % or less. The ratio of the low molecular weight polyol with respect to the total amount of these is, for example, 25 mol % or more, preferably 35 mol % or more, more preferably 50 mol % or more, and for example, 95 mol % or less, preferably 93 mol % or less, more preferably 90 mol % or less, further more preferably 85 mol % or less.

When the content ratio of the low molecular weight polyol and the high molecular weight polyol is within the above-described range, the mechanical properties of a molded article to be obtained (described later) can be improved.

The polyurethane resin of the present invention contains a bismuth catalyst.

In the method for producing a polyurethane resin to be described later, by using the bismuth catalyst (described later) as a urethane-formation catalyst, the bismuth catalyst is contained in the polyurethane resin. That is, though the details are described later, the polyurethane resin of the present invention is produced by using the bismuth catalyst.

The bismuth catalyst content in the polyurethane resin is, for example, 0.1 ppm or more, preferably 0.2 ppm or more, more preferably 0.5 ppm or more, further more preferably 1 ppm or more, and for example, 1000 ppm or less, preferably 800 ppm or less, more preferably 500 ppm or less, further more preferably 100 ppm or less.

When the bismuth catalyst content is below the above-described lower limit, there is a disadvantage that the mechanical properties such as breaking strength and breaking elongation are poor, a molding failure such as fish eye easily occurs, and the molding stability is poor.

When the bismuth catalyst content is above the above-described upper limit, there is a disadvantage that the mechanical properties such as breaking elongation and compression permanent set are poor, the properties easily change according to the molding conditions, furthermore, a molding failure such as fish eye easily occurs, and the molding stability is poor. In addition, when the bismuth catalyst content is above the above-described upper limit, there is a disadvantage that the durability (discoloration resistance) is poor.

Meanwhile, when the bismuth catalyst content is within the above-described range, a molded article (described later) having excellent mechanical properties, excellent molding stability, and furthermore, excellent discoloration resistance can be obtained.

The polyurethane resin of the present invention preferably does not contain a known urethane-formation catalyst other than the bismuth catalyst, more preferably does not contain a tin catalyst.

In the method for producing a polyurethane resin to be described later, by using a known tin catalyst as the urethane-formation catalyst, the tin catalyst is contained in the polyurethane resin. Thus, though the details are described later, the polyurethane resin of the present invention is produced without using the tin catalyst. In this manner, the working environment can be improved.

The tin catalyst content in the polyurethane resin is, for example, 0.1 ppm or less, preferably 0.01 ppm or less, more preferably 0.001 ppm or less, further more preferably 0 ppm.

When the tin catalyst is used (a relatively large amount of tin is contained in the polyurethane resin), its catalytic activity is high, so that there is a disadvantage that the properties drastically differ according to the molding temperature and the molding time of a molded article (described later), and the molding stability is poor including a case where a molding failure (fish eye or the like) is generated.

Meanwhile, when the tin catalyst content is within the above-described range, in other words, when the tin catalyst is not used, the molding stability can be improved.

The bismuth catalyst content and the tin catalyst content can be obtained from the charged formulations in conformity with Examples to be described later.

As shown in the following, the polyurethane resin can be obtained by the method for producing a polyurethane resin including a reaction step and a heat treatment step.

The reaction step is a step of obtaining a primary product (reaction product before heat treatment) by allowing the above-described polyisocyanate component to react with the above-described polyol component under the presence of the bismuth catalyst.

To react each of the components described above (polyisocyanate component, polyol component), for example, a known method such as one shot method and prepolymer method is used. Preferably, a prepolymer method is used.

When each of the components described above reacts by the prepolymer method, the molded article (described later) having excellent mechanical properties can be obtained.

To be specific, in the prepolymer method, first, the polyisocyanate component reacts with the high molecular weight polyol, so that an isocyanate group-terminated polyurethane prepolymer is synthesized (prepolymer synthesis step).

In the prepolymer synthesis step, the polyisocyanate component reacts with the high molecular weight polyol by, for example, a polymerization method such as bulk polymerization and solution polymerization.

In the bulk polymerization, for example, under a nitrogen gas stream, the polyisocyanate component reacts with the high molecular weight polyol at a reaction temperature of, for example, 50° C. or more, and for example, 250° C. or less, preferably 200° C. or less for, for example, 0.5 hours or more, and for example, 15 hours or less.

In the solution polymerization, the polyisocyanate component and the high molecular weight polyol are added to an organic solvent to react at a reaction temperature of, for example, 50° C. or more, and for example, 120° C. or less, preferably 100° C. or less for, for example, 0.5 hours or more, and for example, 15 hours or less.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethyl benzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, and ethyl-3-ethoxypropionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methyl pyrrolidone, dimethyl formamide, N,N'-dimethylacetamide, dimethyl sulfoxide, and hexamethylphosphonylamide.

In the above-described polymerization reaction, the bismuth catalyst is added. The bismuth catalyst is a catalyst (urethane-formation catalyst) that promotes a urethane-formation reaction, and examples thereof include bismuth carboxylates such as bismuth octylate, bismuth neodecanoate, bismuth stearate, and bismuth oleate.

These bismuth catalysts can be used alone or in combination of two or more.

As the bismuth catalyst, preferably, a bismuth carboxylate is used, more preferably, a bismuth octylate is used.

The addition ratio of the bismuth catalyst is appropriately set so that the bismuth catalyst content in the polyurethane resin is within the above-described range. To be specific, the addition ratio of the bismuth catalyst with respect to 10000 parts by mass of the total amount of the polyisocyanate component and the high molecular weight polyol is, for example, 0.001 parts by mass or more, preferably 0.01 parts by mass or more, and for example, 1 part by mass or less, preferably 0.5 parts by mass or less.

In the above-described polymerization reaction, an unreacted polyisocyanate component and an organic solvent (when the organic solvent is used) can be removed by, for example, a known removing method such as distillation and extraction.

In the prepolymer synthesis step, as the mixing ratio of each of the components, the equivalent ratio (isocyanate group/hydroxyl group) of the isocyanate group in the polyisocyanate component with respect to the hydroxyl group in the high molecular weight polyol is, for example, 2.0 or more, preferably 2.5 or more, and for example, 20 or less, preferably 15 or less, more preferably 10 or less, further more preferably 8 or less.

To be more specific, as the mixing ratio of each of the components in the prepolymer synthesis step, the ratio of the polyisocyanate component with respect to 100 parts by mass of the high molecular weight polyol is, for example, 5 parts by mass or more, preferably 10 parts by mass or more, more preferably 15 parts by mass or more, and for example, 100 parts by mass or less, preferably 70 parts by mass or less, more preferably 50 parts by mass or less, further more preferably 30 parts by mass or less.

In the method, the above-described components react until the content ratio of the isocyanate group reaches, for example, 1.0 mass % or more, preferably 3.0 mass % or more, more preferably 4.0 mass % or more, and for example, 30.0 mass % or less, preferably 19.0 mass % or less, more preferably 16.0 mass % or less, further more preferably 12.0 mass % or less, further more preferably 10.0 mass % or less, particularly preferably 5.0 mass % or less. In this manner, the isocyanate group-terminated polyurethane prepolymer can be obtained.

The isocyanate group content (content ratio of the isocyanate group) can be obtained by a known method such as titration method by di-n-butylamine and FT-IR analysis.

Next, in this method, the isocyanate group-terminated polyurethane prepolymer obtained as described above reacts with the low molecular weight polyol, so that a primary product of the polyisocyanate component and the polyol component is obtained (chain extension step).

That is, in this method, the low molecular weight polyol is a chain extension agent.

In the chain extension step, the isocyanate group-terminated polyurethane prepolymer reacts with the low molecular weight polyol by, for example, a polymerization method such as the above-described bulk polymerization and the above-described solution polymerization.

The reaction temperature is, for example, a room temperature or more, preferably 50° C. or more, and for example, 200° C. or less, preferably 150° C. or less, and the reaction time is, for example, 5 minutes or more, preferably 1 hour or more, and for example, 72 hours or less, preferably 48 hours or less.

As the mixing ratio of each of the components, the equivalent ratio (isocyanate group/hydroxyl group) of the isocyanate group in the isocyanate group-terminated polyurethane prepolymer with respect to the hydroxyl group in the low molecular weight polyol is, for example, 0.75 or more, preferably 0.9 or more, and for example, 1.3 or less, preferably 1.1 or less.

To be more specific, as the mixing ratio of each of the components in the chain extension step, the ratio of the low molecular weight polyol with respect to 100 parts by mass of the isocyanate group-terminated polyurethane prepolymer is, for example, 1.0 part by mass or more, preferably 2.0 parts by mass or more, more preferably 3.0 parts by mass or more, and for example, 30 parts by mass or less, preferably 20 parts by mass or less, more preferably 15 parts by mass or less, further more preferably 10 parts by mass or less, particularly preferably 6.0 parts by mass or less.

In the chain extension step, to adjust the concentration of a hard segment (described later) of the polyurethane resin to be obtained, the high molecular weight polyol can be also blended in addition to the low molecular weight polyol.

In the chain extension step, when the high molecular weight polyol is blended, the mixing ratio thereof with respect to 100 parts by mass of the isocyanate group-terminated polyurethane prepolymer is, for example, 5 parts by mass or more, preferably 10 parts by mass or more, more preferably 50 parts by mass or more, and for example, 120 parts by mass or less, preferably 100 parts by mass or less, and the mixing ratio thereof with respect to 1 part by mass of the low molecular weight polyol is, for example, 10 parts by mass or more, preferably 20 parts by mass or more, and for example, 100 parts by mass or less, preferably 50 parts by mass or less, more preferably 30 parts by mass or less.

Furthermore, in the reaction, the above-described bismuth catalyst can be added as needed. The bismuth catalyst can be blended in the isocyanate group-terminated polyurethane prepolymer and/or the low molecular weight polyol, and also can be separately blended at the time of the mixture of these.

As the method for obtaining the above-described primary product, when the one shot method is used, the polyisocyanate component and the polyol component (including the high molecular weight polyol and the low molecular weight polyol) are simultaneously blended to be stirred and mixed at such a ratio that the equivalent ratio (isocyanate group/hydroxyl group) of the isocyanate group in the polyisocyanate component with respect to the hydroxyl group in the polyol component is, for example, 0.9 or more, preferably 0.95 or more, more preferably 0.98 or more, and for example, 1.2 or less, preferably 1.1 or less, more preferably 1.08 or less.

The stirring and mixing is, for example, performed under an inert gas (for example, nitrogen) atmosphere at a reaction temperature of, for example, 40° C. or more, preferably 100° C. or more, and for example, 280° C. or less, preferably 260° C. or less and a reaction time of, for example, 30 seconds or more and 1 hour or less.

The method for the stirring and mixing is not particularly limited, and a method for the stirring and mixing by using a known mixing device such as mixing tank equipped with a disper, a dissolver, and a turbine blade, circulation-type low pressure or high pressure impingement mixing device, high-speed stirring mixer, static mixer, kneader, uniaxial or biaxial rotation extruder, and belt conveyor is used.

At the time of the stirring and mixing, the above-described bismuth catalyst and the above-described organic solvent can be added at an appropriate ratio as needed.

The heat treatment step is a step of obtaining a secondary product (reaction product after the heat treatment, that is, the polyurethane resin that is a reaction product) by subjecting the above-described primary product to heat treatment.

In the heat treatment step, the primary product obtained in the above-described reaction step is subjected to heat treatment by being left to stand for a predetermined heat treatment period at a predetermined heat treatment temperature to be thereafter dried as needed.

The heat treatment temperature is, for example, 50° C. or more, preferably 60° C. or more, more preferably 70° C. or more, and for example, 100° C. or less, preferably 90° C. or less.

When the heat treatment temperature is below the above-described lower limit, there is a disadvantage that the mechanical properties such as tear strength, breaking strength, and breaking elongation are poor, the properties easily change according to the molding conditions, and furthermore, a molding failure such as fish eye easily occurs. When the heat treatment temperature is above the above-described upper limit, there is also a disadvantage that the mechanical properties such as tear strength, breaking strength, and breaking elongation are poor, the properties easily change according to the molding conditions, and furthermore, a molding failure such as fish eye easily occurs. In addition, when the heat treatment temperature is above the above-described upper limit, there is a disadvantage that the durability (discoloration resistance) is poor.

Meanwhile, when the heat treatment temperature is within the above-described range, a molded article (described later) having excellent mechanical properties and excellent molding stability, and furthermore, having excellent discoloration resistance can be obtained.

The heat treatment period is, for example, 3 days or more, preferably 4 days or more, more preferably 5 days or more, further more preferably 6 days or more, and for example, 10 days or less, preferably 9 days or less, more preferably 8 days or less.

When the heat treatment period is below the above-described lower limit, there is a disadvantage that the mechanical properties such as tear strength, breaking strength, and breaking elongation are poor, the properties easily change according to the molding conditions, and furthermore, a molding failure such as fish eye easily occurs. When the heat treatment period is above the above-described upper limit, there is also a disadvantage that the mechanical properties such as tear strength, breaking strength, and breaking elongation are poor, the properties easily change according to the molding conditions, and furthermore, a molding failure such as fish eye easily occurs. In addition, when the heat treatment period is above the above-described upper limit, there is a disadvantage that the durability (discoloration resistance) is poor.

Meanwhile, when the heat treatment period is within the above-described range, a molded article (described later) having excellent mechanical properties and excellent molding stability, and furthermore, having excellent discoloration resistance can be obtained.

In this manner, the polyurethane resin can be obtained.

Also, a known additive can be added to the polyurethane resin as needed. Examples thereof include antioxidants, heat resistant stabilizers, ultraviolet absorbers, light resistant stabilizers, furthermore, plasticizers, blocking inhibitors, release agents, pigments, dyes, lubricants (fatty acid amide-based lubricants), fillers, hydrolysis inhibitors, corrosion inhibitors, fillers, and bluing agents. These additives may be added at the time of the mixture, at the time of the synthesis, or after the synthesis of each of the components.

The heat resistant stabilizer is not particularly limited, and a known heat resistant stabilizer (for example, described in a catalog of BASF Japan) is used. To be more specific, examples thereof include phosphorus-based treatment heat stabilizer, lactone-based treatment heat stabilizer, and sulfur-based treatment heat stabilizer.

The ultraviolet absorber is not particularly limited, and a known ultraviolet absorber (for example, described in a catalog of BASF Japan) is used. To be more specific, examples thereof include benzotriazole ultraviolet absorber, triazine ultraviolet absorber, and benzophenone ultraviolet absorber.

The light resistant stabilizer is not particularly limited, and a known light resistant stabilizer (for example, described in a catalog of ADEKA CORPORATION) is used. To be more specific, examples thereof include benzoate light stabilizer and hindered amine light stabilizer.

Each of these additives is added with respect to the polyurethane resin at a ratio of, for example, 0.01 mass % or more, preferably 0.1 mass % or more, and for example, 3.0 mass % or less, preferably 2.0 mass % or less.

In the method for producing a polyurethane resin, the polyisocyanate component containing the bis(isocyanatomethyl)cyclohexane reacts with the polyol component containing the low molecular weight polyol having a number average molecular weight of 400 or less and the high molecular weight polyol having a number average molecular weight of 2500 or more and 4000 or less under the presence of the bismuth catalyst, and the primary product to be obtained is heat treated under the predetermined conditions.

Thus, the polyurethane resin obtained by the method for producing a polyurethane resin has excellent molding stability, and has excellent mechanical properties even though the bismuth catalyst is used.

To be specific, the above-described polyurethane resin includes a hard segment that is formed by reaction of the polyisocyanate component with the low molecular weight polyol, and a soft segment that is formed by reaction of the polyisocyanate component with the high molecular weight polyol.

The concentration of the hard segment of the polyurethane resin is, for example, 3 mass % or more, preferably 5 mass % or more, more preferably 8 mass % or more, and for example, 55 mass % or less, preferably 50 mass % or less, more preferably 45 mass % or less, further more preferably 35 mass % or less, particularly preferably 20 mass % or less.

When the concentration of the hard segment of the polyurethane resin is within the above-described range, the mechanical properties of a molded article to be obtained (described later) can be improved.

The concentration of the hard segment (hard segment that is formed by the reaction of the polyisocyanate component with the low molecular weight polyol) of the polyurethane resin can be, for example, calculated from the mixing ratio (charging) of each of the components (ref: Examples to be described later).

When the polyisocyanate component contains the 1,4-bis(isocyanatomethyl)cyclohexane, the aggregation temperature of the polyurethane resin corresponds to that of the hard segment phase in the polyurethane resin, and is an aggregation temperature $T_1$ or more of the hard segment phase shown by the following calculation formula and an aggregation temperature $T_2$ or less of the hard segment phase shown by the following calculation formula.

Aggregation temperature $T_1$ of hard segment phase (unit: ° C.): 100+0.75×concentration of hard segment (mass %)

Aggregation temperature $T_2$ of hard segment phase (unit: ° C.): 160+0.75×concentration of hard segment (mass %)

Preferably, the aggregation temperature of the polyurethane resin is an aggregation temperature $T_3$ or more of the hard segment phase shown by the following calculation formula, and an aggregation temperature $T_4$ or less of the hard segment phase shown by the following calculation formula.

Aggregation temperature $T_3$ of hard segment phase (unit: ° C.): 112+0.75×concentration of hard segment (mass %)

Aggregation temperature $T_4$ of hard segment phase (unit: ° C.): 145+0.75×concentration of hard segment (mass %)

The polyurethane resin having the aggregation temperature within the above-described range has excellent mechanical properties.

The above-described calculation formula is not a theoretical formula, and is an empirical formula (experimental formula) obtained by measuring the aggregation temperature of the polyurethane resin having excellent various mechanical properties.

The polyurethane resin having the aggregation temperature can be, for example, easily produced by using a known tin catalyst as the urethane-formation catalyst.

When the tin catalyst is used, there may be a case where the workability and the molding stability are poor. Thus, the use of the bismuth catalyst instead of the tin catalyst is considered. However, when the bismuth catalyst is only used instead of the tin catalyst, there may be a case where the aggregation temperature of the polyurethane resin to be obtained is below the above-described aggregation temperature $T_1$ or above the above-described aggregation temperature $T_2$. The polyurethane resin has poor mechanical properties.

In the above-described method for producing a polyurethane resin, the primary product obtained by the urethane-formation reaction is heat treated (heat aged) under the predetermined conditions.

In this manner, even though the bismuth catalyst is used instead of the tin catalyst, the aggregation temperature of the polyurethane resin can be adjusted within the above-described range, so that the polyurethane resin having excellent mechanical properties can be obtained.

To be specific, the aggregation temperature of the polyurethane resin is, for example, 75° C. or more, preferably 90° C. or more, more preferably 100° C. or more, further more preferably 110° C. or more, particularly preferably 130° C. or more, and for example, 200° C. or less, preferably 180° C. or less, more preferably 170° C. or less, further more preferably 150° C. or less, particularly preferably 140° C. or less.

When the aggregation temperature of the polyurethane resin is the above-described lower limit or more, the breaking strength and the tear strength of a molded article (described later) to be obtained can be improved, and when the aggregation temperature of the polyurethane resin is the above-described upper limit or less, the improvement of the rebound resilience and the suppression of the compression permanent set of a molded article (described later) to be obtained can be achieved.

The aggregation temperature of the polyurethane resin can be measured by differential scanning calorimetry (DSC measurement) in conformity with the conditions of Examples.

The present invention includes a molded article containing the above-described polyurethane resin of the present invention. The molded article is molded from the polyurethane resin.

The molded article can be, for example, obtained by molding the above-described polyurethane resin by a known molding method such as thermal compression molding and injection molding by using a specific mold, extrusion molding by using a sheet winding device, and thermal molding processing method such as melt spinning molding into various shapes such as pellet shape, plate shape, fiber shaper, strand shape, film shape, sheet shape, pipe shape, hollow shape, and box shape.

The obtained molded article has excellent molding stability, and has excellent mechanical properties even though the bismuth catalyst is used.

In the above-described explanation, the polyurethane resin of the present invention and the producing method thereof are the thermoplastic polyurethane resin and the producing method thereof, respectively. Alternatively, the polyurethane resin of the present invention and the producing method thereof can be applied to the thermosetting polyurethane resin and the producing method thereof, respectively.

In the thermosetting polyurethane resin and the producing method thereof, for example, the above-described isocyanate group-terminated polyurethane prepolymer reacts with a dihydric alcohol (1,4-butanediol or the like), a trihydric alcohol (trimethylolpropane or the like), and furthermore, a known aromatic diamine (reaction step) to be subjected to, for example, cast molding. Thereafter, the obtained molded article is heat treated under the above-described conditions (heat treatment step). In this manner, the thermosetting polyurethane resin, and the molded article that is prepared from the thermosetting polyurethane resin can be obtained.

The thermosetting polyurethane resin and the producing method thereof, and furthermore, the molded article that is prepared from the thermosetting polyurethane resin have excellent molding stability, and have excellent mechanical properties even though the bismuth catalyst is used.

Thus, the molded article can be industrially widely available. To be specific, for example, the molded article is preferably used in transparent hard plastics, coating materials, pressure-sensitive adhesives, adhesives, waterproof agents, potting agents, ink, binder, films, sheets, bands (for example, bands such as watch bands, and belts such as transmission belts for automobiles and conveyance belts (conveyor belt) for various industrial uses), tubes (for example, components such as medical tubes and catheters, in addition, tubes such as air tubes, hydraulic tubes, and electric wire tubes, and hoses such as fire hoses), blades, loudspeakers, sensors, high-luminance LED sealants, organic EL members, solar power generation members, robot members, android members, wearable members, clothing goods, sanitary goods, cosmetic articles, food packaging members, sports articles, leisure goods, medical supplies, nursing care articles, members for housing, audio members, lighting members, chandeliers, outside lights, sealing members, sealing materials, corks, packings, vibration-proof vibration-control·base isolation members, soundproof members, daily necessities, miscellaneous goods, cushions, beddings, stress absorbers, stress relievers, automobile interior and exterior components, railway members, aircraft members, optical members, members for OA equipment, protecting members for surfaces of miscellaneous goods, semiconductor sealing materials, self-repairing materials, health equipment, glass lens, toys, packings, cable seaths, wire harnesses, telecommunication cables, automobile wires, computer wires, and industrial goods such as curled cord, sheets, nursing care articles such as film, sports articles, leisure goods, various miscellaneous goods, vibration-proof base isolation materials, impact absorbers, optical materials, films such as optical guiding film, automobile components, surface protecting sheets, decorative sheets, transfer sheets, tape members such as semiconductor protecting tape, outsoles, golf ball members, strings for tennis rackets, films for agriculture, wall paper, defogging imparting agents, threads, fibers, non-woven fabrics, furniture such as mattress and sofa, clothing goods such as brassiere and shoulder pad, medical supplies such as buffer materials of paper diaper, napkin, and medical tape, cosmetics, sanitary goods such as facial washing puff and pillow, shoes articles such as sole (outsole) and midsole, furthermore, body pressure distribution goods such as pad and cushion for vehicles, members touched with a hand such as door trim, instrument panel, and gear knob, heat insulating materials of electric refrigerator and building, shock absorbing materials such as shock absorber, filler, vehicle goods such as vehicle handle, automobile interior member, and automobile exterior member, and semiconductor production articles such as chemical mechanical polishing (CMP) pad.

Furthermore, the above-described molded article is preferably used for uses in which the recoverability and abrasion resistance are required for repeating expansion and contraction, compressive deformation, or the like. Examples of the uses include coating materials (coating materials such as film, sheet, belt, wire, electric wire, rotating machine made of metal, wheel, and drill), threads and fibers (threads and conjugated fibers used for tube, tights, spats, sportswear, and swimsuit), uses for extrusion and molding (uses for extrusion and molding for guts for tennis and badminton, and convergence materials thereof), slash molded article in a powder shape by micropellet-formation, artificial leathers, skins, sheets, packings, covering rolls (covering roll for steel), stickers, sealants, rollers, gears, tablet covers, covers or core materials for balls (covers or core materials for golf ball, basketball, tennis ball, volleyball, and soft ball), shoes members (cover material, midsole, outsole, or the like), ski goods, boots, tennis goods, grips (grips for golf club and two-wheeled vehicle), bats, automobile interior and exterior members, rack boots, windshield wipers, seat cushion members, robots, cosmetics, films for nursing care articles, 3D printer molded articles, fiber-strengthened materials (fiber-strengthened materials for carbon fiber, lignin, kenaf, nanocellulose fiber, and glass fiber), safety goggles, sunglasses, glass frames, ski goggles, swimming goggles, contact lenses, foaming molded articles of gas assist, shock absorbers, CMP polishing pads, dampers, bearings, dust covers, cutting valves, chipping rolls, high-speed rotation rollers, tires, sensors, watches and wearable bands.

EXAMPLES

Next, the present invention is described based on Production Examples, Synthesis Examples, Examples, and Comparative Examples. The present invention is however not limited by these Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

1) Material

<Polyisocyanate Component (a)>
1,4-BIC: 1,4-bis(isocyanatomethyl)cyclohexane synthesized by the method described in Production Examples 1 to 5 to be described later
1,3-BIC: 1,3-bis(isocyanatomethyl)cyclohexane, trade name: TAKENATE 600, manufactured by Mitsui Chemicals, Inc.

<High Molecular Weight Polyol (b)>
b-1) PTMEG (number average molecular weight: 2000): polytetramethylene ether glycol, trade name: TERATHANE 2000, hydroxyl value: 56.0 mgKOH/g, manufactured by INVISTA K.K.
b-2) PTMEG (number average molecular weight: 2900): polytetramethylene ether glycol, trade name: TERATHANE 2900, hydroxyl value: 38.5 mgKOH/g, manufactured by INVISTA K.K.
b-3) PEG (number average molecular weight: 3000): polyethylene glycol, trade name: PEG #4000, hydroxyl value: 37.4 mgKOH/g, manufactured by NOF CORPORATION
b-4) PEG (number average molecular weight: 3500): prepared by blending polyethylene glycol, trade name: PEG #4000, hydroxyl value: 37.4 mgKOH/g, manufactured by NOF CORPORATION with polyethylene glycol, trade name: PEG #6000, hydroxyl value: 12.8 mgKOH/g, manufactured by NOF CORPORATION at a weight ratio of 91:9.
b-5) PEG (number average molecular weight: 4500): prepared by blending polyethylene glycol, trade name: PEG #4000, hydroxyl value: 37.4 mgKOH/g, manufactured by NOF CORPORATION with polyethylene glycol, trade name: PEG #6000, hydroxyl value: 12.8 mgKOH/g, manufactured by NOF CORPORATION at a weight ratio of 74:26.
b-6) PCL (number average molecular weight: 3000): polycaprolactone polyol, trade name: PLACCEL 230N, hydroxyl value: 37.4 mgKOH/g, manufactured by Daicel Corporation <Low Molecular Weight Polyol (c)>
1,4-BD: 1,4-butanediol, trade name: 1,4-butanediol, manufactured by Mitsubishi Chemical Corporation <Urethane-Formation Catalyst>
Bismuth catalyst: bismuth octylate, trade name: NEOSTANN U-600, manufactured by NITTO KASEI CO., LTD.

Tin catalyst: tin octylate (II), trade name: STANOCT, manufactured by API Corporation <Catalyst Diluent>

Diisononyl adipate: trade name: DINA, manufactured by DAIHACHI CHEMICAL INDUSTRY CO., LTD.

<Stabilizer>

Antioxidant: hindered phenol compound, trade name: IRGANOX 245, manufactured by BASF SE Ultraviolet absorber: benzotriazole compound, trade name: TINUVIN 234, manufactured by BASF SE Light resistant stabilizer: hindered amine compound, trade name: LA-72, manufactured by ADEKA CORPORATION 2) Production of Polyurethane Resin Production of 1,4-bis(isocyanatomethyl)cyclohexane (1,4-$H_6$XDI)

Production Example 1 (Production Method of 1,4-bis(isocyanatomethyl)cyclohexane (1) (Hereinafter, Referred to as 1,4-BIC (1))

While 1,4-BIC (2) described in Production Example 2 to be described later was nitrogen-purged, it filled an oil can to be then allowed to stand for two weeks in an incubator at 1° C. The obtained condensate was quickly decompressed and filtered by using a membrane filter having a 4 μm mesh, so that a liquid phase portion was removed and a solid phase portion was obtained. The above-described operation was repeated with respect to the solid phase portion, so that 1,4-BIC (1) was obtained. The purity of the obtained 1,4-BIC (1) with gas chromatography measurement was 99.9%, the color phase with APHA measurement was 5, and a ratio of trans-isomer/cis-isomer with $^{13}$C-NMR measurement was 99.5/0.5. The hydrolysable chlorine concentration (hereinafter, referred to as HC concentration) was 18 ppm.

Production Example 2 (Production Method of 1,4-bis(isocyanatomethyl)cyclohexane (2) (Hereinafter, Referred to as 1,4-BIC (2)))

In conformity with the description of Production Example 6 of Japanese Unexamined Patent Publication No. 2014-55229, a 1,4-bis(aminomethyl)cyclohexane having a ratio of trans-isomer/cis-isomer of 98/2 and having the purity of 99.5% or more was obtained at a yield of 92%.

Thereafter, in conformity with the description of Production Example 1 of Japanese Unexamined Patent Publication No. 2014-55229, a heat and cold two-step phosgenation method was performed by using the 1,4-bis(aminomethyl) cyclohexane as a material under pressure, so that 382 parts by mass of 1,4-BIC (2) was obtained.

The purity of the obtained 1,4-BIC (2) with gas chromatography measurement was 99.9%, the color phase with APHA measurement was 5, and a ratio of trans-isomer/cis-isomer with $^{13}$C-NMR measurement was 98/2. The HC concentration was 18 ppm.

Production Example 3 (Production Method of 1,4-bis(isocyanatomethyl)cyclohexane (3) (Hereinafter, Referred to as 1,4-BIC (3)))

A four-neck flask equipped with a stirrer, a thermometer, a reflux tube, and a nitrogen inlet tube was charged with 789 parts by mass of 1,4-BIC (2) obtained in Production Example 2 and 211 parts by mass of 1,4-BIC (6) obtained in Production Example 6 to be described later to be then stirred at a room temperature for 1 hour under a nitrogen atmosphere. The purity of the obtained 1,4-BIC (3) with gas chromatography measurement was 99.9%, the color phase with APHA measurement was 5, and a ratio of trans-isomer/cis-isomer with $^{13}$C-NMR measurement was 86/14. The HC concentration was 19 ppm.

Production Example 4 (Production Method of 1,4-bis(isocyanatomethyl)cyclohexane (4) (Hereinafter, Referred to as 1,4-BIC (4)))

A four-neck flask equipped with a stirrer, a thermometer, a reflux tube, and a nitrogen inlet tube was charged with 561 parts by mass of 1,4-BIC (2) obtained in Production Example 2 and 439 parts by mass of 1,4-BIC (6) obtained in Production Example 6 to be described later to be then stirred at a room temperature for 1 hour under a nitrogen atmosphere. The purity of the obtained 1,4-BIC (4) with gas chromatography measurement was 99.9%, the color phase with APHA measurement was 5, and a ratio of trans-isomer/cis-isomer with $^{13}$C-NMR measurement was 73/27. The HC concentration was 20 ppm.

Production Example 5 (Production Method of 1,4-bis(isocyanatomethyl)cyclohexane (5) (Hereinafter, Referred to as 1,4-BIC (5)))

A four-neck flask equipped with a stirrer, a thermometer, a reflux tube, and a nitrogen inlet tube was charged with 474 parts by mass of 1,4-BIC (2) obtained in Production Example 2 and 526 parts by mass of 1,4-BIC (6) obtained in Production Example 6 to be described later to be then stirred at a room temperature for 1 hour under a nitrogen atmosphere. The purity of the obtained 1,4-BIC (5) with gas chromatography measurement was 99.9%, the color phase with APHA measurement was 5, and a ratio of trans-isomer/cis-isomer with $^{13}$C-NMR measurement was 68/32. The HC concentration was 21 ppm.

Production Example 6 (Production Method of 1,4-bis(isocyanatomethyl)cyclohexane (6) (Hereinafter, Referred to as 1,4-BIC (6)))

By using a 1,4-bis(aminomethyl)cyclohexane (manufactured by Tokyo Chemical Industry Co., Ltd.) having a ratio of trans-isomer/cis-isomer of 41/59 with $^{13}$C-NMR measurement as a material, 388 parts by mass of 1,4-BIC (6) was obtained in conformity with the description of Production Example 1 of Japanese Unexamined Patent Publication No. 2014-55229.

The purity of the obtained 1,4-BIC (6) with gas chromatography measurement was 99.9%, the color phase with APHA measurement was 5, and a ratio of trans-isomer/cis-isomer with $^{13}$C-NMR measurement was 41/59. The HC concentration was 22 ppm.

Synthesis of Isocyanate Group-Terminated Polyurethane Prepolymer

Synthesis Examples 1 to 19

A four-neck flask equipped with a stirrer, a thermometer, a reflux tube, and a nitrogen inlet tube was charged with the polyisocyanate component (a) and the high molecular weight polyol (b) with the mass ratio described in Tables 1 to 2 to be then stirred at 80° C. for 1 hour under a nitrogen atmosphere.

A urethane-formation catalyst was added so as to have the bismuth catalyst content or the tin catalyst content described in Tables 1 to 2 with respect to the total amount of the polyisocyanate component (a) and the high molecular weight polyol (b).

As the urethane-formation catalyst, in Synthesis Examples 1 to 5 (isocyanate group-terminated polyurethane prepolymers (a) to (e)), Synthesis Examples 7 to 14 (isocyanate group-terminated polyurethane prepolymers (g) to (n)), and Synthesis Examples 17 to 19 (isocyanate group-terminated polyurethane prepolymers (q) to (s)), a bismuth octylate (trade name: NEOSTANN U-600, manufactured by NITTO KASEI CO., LTD.) diluted in 4 mass % with DINA (manufactured by J-PLUS Co., Ltd.) in advance was used.

As the urethane-formation catalyst, in Synthesis Example 6 (isocyanate group-terminated polyurethane prepolymer (f)) and Synthesis Example 15 (isocyanate group-terminated polyurethane prepolymer (o)), an undiluted bismuth octylate (trade name: NEOSTANN U-600, manufactured by NITTO KASEI CO., LTD.) was used.

As the urethane-formation catalyst, in Synthesis Example 16 (isocyanate group-terminated polyurethane prepolymer (p)), a tin octylate (trade name: STANOCT, manufactured by API Corporation) diluted in 4 mass % with DINA (manufactured by J-PLUS Co., Ltd.) in advance was used.

After the urethane-formation catalyst was added to the obtained mixture, the reaction was progressed until the isocyanate group content described in Table 1 under a temperature control of 80° C. and a nitrogen gas stream, while the resulting mixture was stirred and mixed, so that the isocyanate group-terminated polyurethane prepolymers (a) to (s) were obtained.

Synthesis of Polyurethane Resin

Examples 1 to 16 and Comparative Examples 1 to 13

The concentration of the isocyanate group of the isocyanate group-terminated polyurethane prepolymer by controlling the temperature to 80° C. was measured.

Then, the 1,4-butanediol (1,4-BD) as the low molecular weight polyol was weighed in a stainless steel cup by controlling the temperature to 80° C. so that the equivalent ratio (isocyanate group/hydroxyl group) of the isocyanate group in the isocyanate group-terminated polyurethane prepolymer to the hydroxyl group in the low molecular weight polyol was the values described in Tables 3 to 5.

Next, the isocyanate group-terminated polyurethane prepolymer was weighed in another stainless steel cup, and with respect to the total amount of the isocyanate group-terminated polyurethane prepolymer and 1,4-BD, 2 parts by mass of IRGANOX 245 (manufactured by BASF SE, heat resistant stabilizer), 0.3 parts by mass of TINUVIN 234 (manufactured by BASF SE, ultraviolet absorber), and 0.3 parts by mass of ADEKA STAB LA-72 (manufactured by ADEKA CORPORATION, HALS) were added to the isocyanate group-terminated polyurethane prepolymer. In Examples 14 to 16, furthermore, 0.1 parts by mass of KAO WAX EB-P (manufactured by Kao Corporation, fatty acid amide-based lubricant) was added.

Next, the isocyanate group-terminated polyurethane prepolymer was stirred and mixed in an oil bath of 80° C. for 3 minutes by using a high-speed stirring disper under stirring of 500 to 1500 rpm.

Next, 1,4-BD weighed in advance whose temperature was controlled to 80° C. was added to the isocyanate group-terminated polyurethane prepolymer to be stirred and mixed for 3 to 10 minutes by using a high-speed stirring disper under stirring of 500 to 1500 rpm.

Next, a liquid mixture was poured into a vat made of Teflon (registered trademark) whose temperature was controlled to 150° C. in advance to react at 150° C. for 2 hours, and thereafter, the temperature was lowered to 100° C. to continue the reaction for 20 hours, so that primary products (A) to (AC) of the polyurethane resin were obtained.

Next, each of the primary products (A) to (AC) of the polyurethane resin was removed from the vat to be cut into cubes with a bale cutter and pulverized the cubic resin with a pulverizing machine, thereby obtaining a pulverized pellet.

Next, the pulverized pellet was subjected to heat treatment (aged, matured) at the heat treatment temperature for a heat treatment period described in Tables 2 and 3 to be dried at 23° C. for 12 hours under a vacuum reduced pressure.

Thereafter, by using the obtained pulverized pellet, the strand was extruded at a screw rotation number of 30 rpm in a range of 200 to 270° C. of the cylinder temperature with a single screw extruder (type: SZW40-28MG, manufactured by TECHNOVEL CORPORATION) to be cut, so that pellets of the polyurethane resins (A) to (AC) were obtained.

3) Property Measurement of Polyurethane Resin

<Bismuth Catalyst Content and Tin Catalyst Content (Unit: Ppm)>

The bismuth catalyst content and the tin catalyst content of the polyurethane resin were calculated from the mixing ratio (charging) of each of the components.

<Aggregation Temperature (Unit: ° C.)>

The aggregation temperature of the polyurethane resin was measured by using a differential scanning calorimeter (manufactured by SII NanoTechnology Inc., trade name: EXSTAR6000 PC Station and DSC220C).

To be specific, about 8 mg of each of the polyurethane resins obtained in Examples and Comparative Examples was thinly cut so as to have a shape capable of being tightly in contact with an aluminum-made pan to be collected thereon. The aluminum-made pan was covered with a cover to be crimped, thereby obtaining a measurement sample (sample). The alumina was collected in the same manner to be defined as a reference sample. The sample and the reference were set in a predetermined position in the cell; thereafter, the sample was cooled until −100° C. at a rate of 10° C./min under a nitrogen gas stream of flow of 40 NmL/min to be retained at the same temperature for 5 minutes; and next, the temperature thereof was increased to 270° C. at a rate of 10° C./min. Furthermore, after the sample was retained at 270° C. for 5 minutes, it was cooled until −70° C. at a rate of 10° C./min. The temperature of the exothermic peak appeared during this cooling was defined as the aggregation temperature of the polyurethane resin.

The distribution diagram illustrating the aggregation temperature of each of the polyurethane resins of Examples and Comparative Examples is shown in FIG. 1.

4) Molding of Evaluation Sample (Molded Article)

<Extruding and Molding>

The pellet of each of the polyurethane resins obtained in Examples and Comparative Examples was dried at 80° C. for 12 hours under a vacuum reduced pressure in advance. By using a single screw extruder (type: SZW40-28MG, manufactured by TECHNOVEL CORPORATION), the resin was extruded from a T-die at a screw rotation number of 20 rpm (retention time of 8 minutes) in a range of 200 to 270° C. of the cylinder temperature to be received with a belt conveyor, so that a film having a thickness of 100 μm and a film having a thickness of 10 μm were obtained.

Next, after the obtained film was subjected to anneal treatment for 24 hours at an oven of 80° C., it was aged for 7 days under constant temperature and constant humidity conditions of a room temperature of 23° C. and the relative humidity of 55%, so that a polyurethane film was obtained.

<Extruding and Molding with Extended Retention Time>

A polyurethane film having a thickness of 100 μm was obtained in the same manner as the molding method of the extruding and molding polyurethane film, except that the screw rotation number was changed to 5 rpm (retention time of 30 minutes).

<Injection Molding>

The pellet of each of the polyurethane resins obtained in Examples and Comparative Examples was dried at 80° C. for 12 hours under a vacuum reduced pressure in advance. The dried pellet was injection molded into a sheet having a thickness of 2 mm by using an injection molding machine (type: NEX-140, manufactured by NISSEI PLASTIC INDUSTRIAL CO., LTD.) at setting of a screw rotation number of 80 rpm and a barrel temperature of 200 to 270° C. under the conditions of a metal mold temperature of 20° C., an injection time of 10 seconds, an injection rate of 60 mm/s, a holding pressure of 50 MPa, and a cooling time of 20 to 60 seconds.

Next, after an obtained sheet was subjected to anneal treatment for 24 hours at an oven of 80° C., it was aged for 7 days under constant temperature and constant humidity conditions of a room temperature of 23° C. and the relative humidity of 55%, so that a polyurethane sheet was obtained.

5) Evaluation

<Tear Strength (Unit: kN/m)>

By using a right-angled tear test piece fabricated from the polyurethane film having a thickness of 100 μm obtained from the extruding and molding at a screw rotation number of 20 rpm in accordance with JIS K 7311 (1995), the measurement was carried out with a tensile testing machine (part number: Model 205N, manufactured by INTESCO Co., Ltd.) under the conditions of a tear rate of 300 mm/min.

<Breaking Strength (Unit: MPa) and Breaking Elongation (Unit: %)>

By using a JIS No. 4 dumbbell-type test piece fabricated from the polyurethane film having a thickness of 100 μm obtained from the extruding and molding at a screw rotation number of 20 rpm in accordance with JIS K 7311 (1995), the measurement was carried out with a tensile testing machine (part number: Model 205N, manufactured by INTESCO Co., Ltd.) under the conditions of a tensile rate of 300 mm/min and a gauge length of 20 mm.

<Rebound Resilience (Unit: %)>

A cylindrical test piece having a diameter of 29 mm was cut from the polyurethane sheet having a thickness of 2 mm obtained from the injection molding, and six pieces thereof were stacked to obtain a button-shaped test piece having a thickness of 12 mm to be measured in conformity with JIS K 7311 (1995).

<Compression Permanent Set (Unit: %)>

A cylindrical test piece having a diameter of 29 mm was cut from the polyurethane sheet having a thickness of 2 mm obtained from the injection molding, and six pieces thereof were stacked to obtain a button-shaped test piece having a thickness of 12 mm to be measured under the conditions of 70° C., a compression of 25%, and 22 hours in conformity with JIS K 6262.

<Residual Strain after Repeated Elongation and Deformation (Unit: %)>

A strip-shaped test piece having a width of 10 mm was cut from the polyurethane film having a thickness of 10 μm obtained from the extruding and molding at a screw rotation number of 20 rpm, and the operation of expanding until elongation of 250% and returning to the origin was repeated five times under the conditions of a distance between chucks of 60 mm and an elongation rate of 500 mm/min.

At the time of returning to the origin from the elongation of 250% in the fifth cycle, the elongation where the stress showed 0 MPa was measured as the residual strain after repeated elongation and deformation.

<Reduction of Outflow Starting Temperature after Retention (Molding Stability) (Unit: ° C.)>

After a polyurethane film having a thickness of 100 μm obtained from the extruding and molding at a screw rotation number of 5 rpm and 20 rpm was finely cut to be dried at 80° C. for 12 hours under a vacuum reduced pressure, by using a Koka-type flow tester (manufactured by Shimadzu Corporation, type: Shimadzu Flow Tester CFT-500), the temperature lower than the flow starting temperature by 20° C. was defined as the measurement starting temperature, and the outflow starting temperature ($T_f$) was measured by a temperature rising method at a load of 196N and a temperature rising rate of 2.5° C./min.

The outflow starting temperature of the polyurethane film obtained at a screw rotation number of 5 rpm was defined as $T_{f,\ 5\ rpm}$, and the outflow starting temperature of the polyurethane film obtained at a screw rotation number of 20 rpm was defined as $T_{f,\ 20\ rpm}$.

The formula: $T_{f,\ 20\ rpm} - T_{f,\ 5\ rpm}$ was calculated as a reduction of the outflow starting temperature after the retention.

It shows that the smaller the value of $T_{f,\ 20\ rpm} - T_{f,\ 5\ rpm}$ is, the more excellent the molding stability is without allowing the outflow starting temperature to depend on the molding conditions.

<Breaking Strength Retention Rate (Molding Stability) (Unit: %)>

By using the polyurethane film having a thickness of 100 μm obtained from the extruding and molding at a screw rotation number of 5 rpm and 20 rpm, the breaking strength (TS) was measured in accordance with the above-described measurement method of the breaking strength. The breaking strength of the polyurethane film obtained at a screw rotation number of 5 rpm was defined as $TS_{5\ rpm}$, and the breaking strength of the polyurethane film obtained at a screw rotation number of 20 rpm was defined as $TS_{20\ rpm}$.

The formula: $TS_{5\ rpm}/TS_{20\ rpm} \times 100$ (%) was calculated as the breaking strength retention rate.

It shows that the closer the value of $TS_{5\ rpm}/TS_{20\ rpm} \times 100$ (%) is to 100%, the more excellent the molding stability is without allowing the breaking strength of the molded article to depend on the molding conditions.

<Tear Strength Retention Rate (Molding Stability) (Unit: %)>

By using the polyurethane film having a thickness of 100 μm obtained from the extruding and molding at a screw rotation number of 5 rpm and 20 rpm, the tear strength (TR) was measured in accordance with the above-described measurement method of the tear strength. The tear strength of the polyurethane film obtained at a screw rotation number of 5 rpm was defined as $TR_{5\ rpm}$, and the tear strength of the polyurethane film obtained at a screw rotation number of 20 rpm was defined as $TR_{20\ rpm}$.

The formula: $TR_{5\ rpm}/TR_{20\ rpm} \times 100$ (%) was calculated as the tear strength retention rate.

It shows that the closer the value of $TR_{5\ rpm}/TR_{20\ rpm} \times 100$ (%) is to 100%, the more excellent the molding stability is without allowing the tear strength of the molded article to depend on the molding conditions.

<Initial Color Phase, Resistance to Discoloration by UV>

A test piece having a size of 20 mm×60 mm was cut from the polyurethane sheet having a thickness of 2 mm. The yellowness b* thereof was measured by using a color difference meter (manufactured by Tokyo Denshoku Co., Ltd., Color Ace Model TC-1). b* is generally defined as a reference of the color phase of polyurethane.

Thereafter, by using a QUV weathering tester equipped with an ultraviolet fluorescent (manufactured by Suga Test Instruments Co., Ltd., ultraviolet fluorescent weather meter FUV) with respect to the polyurethane sheet, 6 cycles of the conditions of 60° C., the relative humidity of 10%, and the irradiation intensity of the ultraviolet ray (wavelength of 270 to 720 nm) of 28 W/m² and the conditions of 50° C., the relative humidity of 95%, and the absence of irradiation of the ultraviolet ray were repeated every four hours over 48 hours.

Δb (amount of change of b value) of the polyurethane sheet before and after the test was measured by using the color difference meter (manufactured by Tokyo Denshoku Co., Ltd., Color Ace Model TC-1). Δb is generally defined as a reference of the resistance to discoloration by UV of the polyurethane.

<Fish Eye (Molding Stability) (Unit: Piece)>

By using the polyurethane film having a thickness of 100 μm obtained from the extruding and molding at a screw rotation number of 20 rpm, defect portions having a diameter of 0.4 mm or more contained in 10-centimeter square were counted. The integer value obtained by rounding off to the first decimal place of the average value of the counted number in five places was described as the fish eye.

TABLE 1

| | | | Synthesis Ex. 1 | Synthesis Ex. 2 | Synthesis Ex. 3 | Synthesis Ex. 4 | Synthesis Ex. 5 | Synthesis Ex. 6 |
|---|---|---|---|---|---|---|---|---|
| Isocyanate Group-Terminated Polyurethane Prepolymer | | | a | b | c | d | e | f |
| Polyisocyanate Component (a) [parts by mass] | 1,4-BIC | Trans 99.5% | — | — | — | — | — | — |
| | | Trans 98% | — | — | — | — | — | — |
| | | Trans 86% | 22.9 | 21.9 | 47.3 | 41.2 | 22.9 | 22.9 |
| | | Trans 73% | — | — | — | — | — | — |
| | | Trans 68% | — | — | — | — | — | — |
| | 1,3-BIC | | — | — | — | — | — | — |
| High Molecular Weight Polyol (b) [parts by mass] | b-1) PTMEG (Number Average Molecular Weight of 2000) | | — | — | — | — | — | — |
| | b-2) PTMEG (Number Average Molecular Weight of 2900) | | 100 | — | — | — | 100 | 100 |
| | b-3) PEG (Number Average Molecular Weight of 3000) | | — | — | 100 | — | — | — |
| | b-4) PEG (Number Average Molecular Weight of 3500) | | — | 100 | — | — | — | — |
| | b-5) PEG (Number Average Molecular Weight of 4500) | | — | — | — | — | — | — |
| | b-6) PCL (Number Average Molecular Weight of 3000) | | — | — | — | 100 | — | — |
| Bismuth Catalyst Content (ppm) | | | 1 | 1 | 1 | 1 | 0.15 | 800 |
| Tin Catalyst Content (ppm) | | | — | — | — | — | — | — |
| Isocyanate Group Content (mass %) | | | 5.70 | 5.81 | 11.99 | 10.63 | 5.70 | 5.70 |

| | | | Synthesis Ex. 7 | Synthesis Ex. 8 | Synthesis Ex. 9 | Synthesis Ex. 10 | Synthesis Ex. 11 |
|---|---|---|---|---|---|---|---|
| Isocyanate Group-Terminated Polyurethane Prepolymer | | | g | h | i | j | k |
| Polyisocyanate Component (a) [parts by mass] | 1,4-BIC | Trans 99.5% | 22.9 | — | — | — | — |
| | | Trans 98% | — | 22.9 | — | — | — |
| | | Trans 86% | — | — | — | — | — |
| | | Trans 73% | — | — | 22.9 | — | — |
| | | Trans 68% | — | — | — | 22.9 | — |
| | 1,3-BIC | | — | — | — | — | 46.5 |
| High Molecular Weight Polyol (b) [parts by mass] | b-1) PTMEG (Number Average Molecular Weight of 2000) | | — | — | — | — | — |
| | b-2) PTMEG (Number Average Molecular Weight of 2900) | | 100 | 100 | 100 | 100 | 100 |
| | b-3) PEG (Number Average Molecular Weight of 3000) | | — | — | — | — | — |
| | b-4) PEG (Number Average Molecular Weight of 3500) | | — | — | — | — | — |

TABLE 1-continued

| | | | | | | |
|---|---|---|---|---|---|---|
| | b-5) PEG (Number Average Molecular Weight of 4500) | — | — | — | — | — |
| | b-6) PCL (Number Average Molecular Weight of 3000) | — | — | — | — | — |
| Bismuth Catalyst Content (ppm) | | 1 | 1 | 1 | 1 | 1 |
| Tin Catalyst Content (ppm) | | — | — | — | — | — |
| Isocyanate Group Content (mass %) | | 5.70 | 5.70 | 5.70 | 5.70 | 11.75 |

TABLE 2

| | | | No. | | | | |
|---|---|---|---|---|---|---|---|
| | | | Synthesis Ex. 12 | Synthesis Ex. 13 | Synthesis Ex. 14 | Synthesis Ex. 15 | Synthesis Ex. 16 |
| Isocyanate Group-Terminated Polyurethane Prepolymer | | | l | m | n | o | p |
| Polyisocyanate Component (a) [parts by mass] | 1,4-BIC | Trans 99.5% | — | — | — | — | — |
| | | Trans 98% | — | — | — | — | — |
| | | Trans 86% | 26.3 | 20.5 | 22.9 | 22.9 | 22.9 |
| | | Trans 73% | — | — | — | — | — |
| | | Trans 68% | — | — | — | — | — |
| | | 1,3-BIC | — | — | — | — | — |
| High Molecular Weight Polyol (b) [parts by mass] | b-1) PTMEG (Number Average Molecular Weight of 2000) | | 100.0 | — | — | — | — |
| | b-2) PTMEG (Number Average Molecular Weight of 2900) | | — | — | 100 | 100 | 100 |
| | b-3) PEG (Number Average Molecular Weight of 3000) | | — | — | — | — | — |
| | b-4) PEG (Number Average Molecular Weight of 3500) | | — | — | — | — | — |
| | b-5) PEG (Number Average Molecular Weight of 4500) | | — | 100 | — | — | — |
| | b-6) PCL (Number Average Molecular Weight of 3000) | | — | — | — | — | — |
| Bismuth Catalyst Content (ppm) | | | 1 | 1 | 0.05 | 1200 | — |
| Tin Catalyst Content (ppm) | | | — | — | — | — | 10 |
| Isocyanate Group Content (mass %) | | | 5.70 | 5.81 | 5.70 | 5.70 | 5.70 |

| | | | No. | | |
|---|---|---|---|---|---|
| | | | Synthesis Ex. 17 | Synthesis Ex. 18 | Synthesis Ex. 19 |
| Isocyanate Group-Terminated Polyurethane Prepolymer | | | q | r | s |
| Polyisocyanate Component (a) [parts by mass] | 1,4-BIC | Trans 99.5% | — | — | — |
| | | Trans 98% | — | — | — |
| | | Trans 86% | 19.7 | 16.7 | 14.0 |
| | | Trans 73% | — | — | — |
| | | Trans 68% | — | — | — |
| | | 1,3-BIC | — | — | — |
| High Molecular Weight Polyol (b) [parts by mass] | b-1) PTMEG (Number Average Molecular Weight of 2000) | | — | — | — |
| | b-2) PTMEG (Number Average Molecular Weight of 2900) | | 100.0 | 100.0 | 100.0 |
| | b-3) PEG (Number Average Molecular Weight of 3000) | | — | — | — |
| | b-4) PEG (Number Average Molecular Weight of 3500) | | — | — | — |
| | b-5) PEG (Number Average Molecular Weight of 4500) | | — | — | — |
| | b-6) PCL (Number Average Molecular Weight of 3000) | | — | — | — |
| Bismuth Catalyst Content (ppm) | | | 1 | 1 | 1 |
| Tin Catalyst Content (ppm) | | | — | — | — |
| Isocyanate Group Content (mass %) | | | 4.70 | 3.72 | 2.77 |

TABLE 3

| | | | Ex. 1 | Ex. 2 | Ex. 3 | Ex. 4 | Ex. 5 | Ex. 6 |
|---|---|---|---|---|---|---|---|---|
| | Polyurethane Resin | | A | B | C | D | E | F |
| | Isocyanate Group-Terminated Polyurethane Prepolymer | | a | b | c | d | e | f |
| | 1,4-BD (parts by mass to 100 parts by mass of Prepolymer) | | 6.0 | 6.0 | 12.5 | 11.3 | 6.0 | 6.0 |
| | Equivalent Ratio (NCO/OH) | | 1.01 | 1.03 | 1.03 | 1.01 | 1.01 | 1.01 |
| | Concentration of Hard Segment (HS Concentration) | mass % | 18 | 18 | 35 | 32 | 18 | 18 |
| | Heat Treatment Temperature | °C. | 80 | 80 | 80 | 80 | 80 | 80 |
| | Heat Treatment Period | Day | 7 | 7 | 7 | 7 | 7 | 7 |
| Properties | $T_1$ (Calculation Value) | °C. | 114 | 114 | 126 | 124 | 114 | 114 |
| | $T_2$ (Calculation Value) | °C. | 174 | 174 | 186 | 184 | 174 | 174 |
| | Aggregation Temperature (Measured Value) | °C. | 147 | 144 | 163 | 165 | 135 | 133 |
| | Bismuth Catalyst Content (/Polyurethane Resin) | ppm | 0.94 | 0.94 | 0.89 | 0.90 | 0.14 | 755 |
| Evaluation | Tear Strength | kN/m | 120 | 118 | 156 | 170 | 110 | 113 |
| | Breaking Strength | MPa | 38 | 35 | 52 | 61 | 33 | 34 |
| | Breaking Elongation | % | 680 | 850 | 780 | 640 | 630 | 650 |
| | Rebound Resilience | % | 74 | 72 | 63 | 60 | 72 | 73 |
| | Compression Permanent Set | % | 33 | 25 | 31 | 30 | 35 | 36 |
| | Residual Strain | % | 25 | 19 | 49 | 55 | 28 | 27 |
| | Reduction of Outflow Starting Temperature after Retention | °C. | 2 | 3 | 2 | 2 | 3 | 7 |
| | Breaking Strength Retention Rate | % | 90 | 90 | 91 | 92 | 90 | 76 |
| | Tear Strength Retention Rate | % | 91 | 88 | 89 | 92 | 90 | 75 |
| | Initial Color Phase | b* | 1.2 | 1.3 | 1.4 | 1.3 | 1.1 | 1.8 |
| | Resistance to Discoloration by UV | Δb | 1.1 | 1.0 | 1.2 | 0.9 | 1.0 | 2.1 |
| | Fish Eye | Piece | 1 | 1 | 1 | 1 | 2 | 6 |

| | | | Ex. 7 | Ex. 8 | Ex. 9 | Ex. 10 | Ex. 11 | Ex. 12 | Ex. 13 |
|---|---|---|---|---|---|---|---|---|---|
| | Polyurethane Resin | | G | H | I | J | K | L | M |
| | Isocyanate Group-Terminated Polyurethane Prepolymer | | a | a | g | h | i | j | k |
| | 1,4-BD (parts by mass to 100 parts by mass of Prepolymer) | | 6.0 | 6.0 | 6.0 | 6.0 | 6.0 | 6.0 | 12.5 |
| | Equivalent Ratio (NCO/OH) | | 1.01 | 1.01 | 1.01 | 1.01 | 1.01 | 1.01 | 1.01 |
| | Concentration of Hard Segment (HS Concentration) | mass % | 18 | 18 | 18 | 18 | 18 | 18 | 35 |
| | Heat Treatment Temperature | °C. | 80 | 80 | 80 | 80 | 80 | 80 | 80 |
| | Heat Treatment Period | Day | 4 | 10 | 7 | 7 | 7 | 7 | 7 |
| Properties | $T_1$ (Calculation Value) | °C. | 114 | 114 | 114 | 114 | 114 | 114 | 126 |
| | $T_2$ (Calculation Value) | °C. | 174 | 174 | 174 | 174 | 174 | 174 | 186 |
| | Aggregation Temperature (Measured Value) | °C. | 138 | 141 | 151 | 158 | 125 | 117 | No Peak |
| | Bismuth Catalyst Content (/Polyurethane Resin) | ppm | 0.94 | 0.94 | 0.94 | 0.94 | 0.94 | 0.94 | 0.89 |
| Evaluation | Tear Strength | kN/m | 118 | 115 | 110 | 135 | 106 | 98 | 78 |
| | Breaking Strength | MPa | 36 | 35 | 35 | 43 | 35 | 30 | 27 |
| | Breaking Elongation | % | 620 | 650 | 470 | 670 | 720 | 750 | 850 |
| | Rebound Resilience | % | 73 | 72 | 72 | 75 | 72 | 69 | 37 |
| | Compression Permanent Set | % | 34 | 35 | 39 | 29 | 36 | 39 | 43 |
| | Residual Strain | % | 27 | 26 | 30 | 21 | 29 | 32 | 65 |
| | Reduction of Outflow Starting Temperature after Retention | °C. | 2 | 2 | 2 | 1 | 3 | 6 | 7 |
| | Breaking Strength Retention Rate | % | 89 | 89 | 91 | 93 | 86 | 81 | 68 |
| | Tear Strength Retention Rate | % | 88 | 89 | 90 | 94 | 85 | 82 | 71 |
| | Initial Color Phase | b* | 1.1 | 1.7 | 1.5 | 1.3 | 1.2 | 1.3 | 1.4 |
| | Resistance to Discoloration by UV | Δb | 1.0 | 1.7 | 1.0 | 1.1 | 1.2 | 1.3 | 1.7 |
| | Fish Eye | Piece | 5 | 3 | 4 | 1 | 2 | 2 | 2 |

TABLE 4

| No. | | | Ex. 14 | Ex. 15 | Ex. 16 |
|---|---|---|---|---|---|
| Polyurethane Resin | | | AA | AB | AC |
| Isocyanate Group-Terminated Polyurethane Prepolymer | | | q | r | s |
| 1,4-BD (parts by mass to 100 parts by mass of Prepolymer) | | | 5.0 | 4.0 | 2.9 |
| Equivalent Ratio (NCO/OH) | | | 1.01 | 1.01 | 1.01 |
| Concentration of Hard Segment (HS Concentration) | | mass % | 15 | 12 | 9 |
| Heat Treatment Temperature | | °C. | 80 | 80 | 80 |
| Heat Treatment Period | | Day | 7 | 7 | 7 |
| Properties | $T_1$ (Calculation Value) | °C. | 111 | 109 | 107 |
| | $T_2$ (Calculation Value) | °C. | 171 | 169 | 167 |
| | Aggregation Temperature (Measured Value) | °C. | 142 | 140 | 138 |
| | Bismuth Catalyst Content (/Polyurethane Resin) | ppm | 0.95 | 0.96 | 0.97 |
| Evaluation | Tear Strength | kN/m | 102 | 91 | 81 |
| | Breaking Strength | MPa | 37 | 35 | 34 |
| | Breaking Elongation | % | 730 | 780 | 820 |

TABLE 4-continued

| No. | | Ex. 14 | Ex. 15 | Ex. 16 |
|---|---|---|---|---|
| Rebound Resilience | % | 76 | 77 | 78 |
| Compression Permanent Set | % | 31 | 29 | 28 |
| Residual Strain | % | 21 | 17 | 12 |
| Reduction of Outflow Starting Temperature after Retention | °C. | 2 | 2 | 2 |
| Breaking Strength Retention Rate | % | 91 | 89 | 90 |
| Tear Strength Retention Rate | % | 90 | 91 | 89 |
| Initial Color Phase | b* | 1.2 | 1.1 | 1.1 |
| Resistance to Discoloration by UV | Δb | 1.2 | 1.1 | 1.2 |
| Fish Eye | Piece | 1 | 1 | 1 |

TABLE 5

| | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| | Polyurethane Resin | | N | O | P | Q | R | S |
| | Isocyanate Group-Terminated Polyurethane Prepolymer | | l | m | n | o | a | a |
| | 1,4-BD (parts by mass to 100 parts by mass of Prepolymer) | | 6.0 | 6.0 | 6.0 | 6.0 | 6.0 | 6.0 |
| | Equivalent Ratio (NCO/OH) | | 1.01 | 1.03 | 1.01 | 1.01 | 1.01 | 1.01 |
| | Concentration of Hard Segment (HS Concentration) | mass % | 18 | 18 | 18 | 18 | 18 | 18 |
| | Heat Treatment Temperature | °C. | 80 | 80 | 80 | 80 | 23 | 120 |
| | Heat Treatment Period | Day | 7 | 7 | 7 | 7 | 7 | 7 |
| Properties | T$_1$ (Calculation Value) | °C. | 114 | 114 | 114 | 114 | 114 | 114 |
| | T$_2$ (Calculation Value) | °C. | 174 | 174 | 174 | 174 | 174 | 174 |
| | Aggregation Temperature (Measured Value) | °C. | 108 | 109 | 110 | 103 | 105 | 108 |
| | Bismuth Catalyst Content (/Polyurethane Resin) | ppm | 0.94 | 0.94 | 0.05 | 1132 | 0.94 | 0.94 |
| Evaluation | Tear Strength | kN/m | 110 | 71 | 98 | 103 | 93 | 98 |
| | Breaking Strength | MPa | 35 | 28 | 25 | 30 | 27 | 29 |
| | Breaking Elongation | % | 500 | 830 | 550 | 590 | 530 | 530 |
| | Rebound Resilience | % | 65 | 69 | 68 | 69 | 67 | 68 |
| | Compression Permanent Set | % | 45 | 31 | 39 | 40 | 40 | 39 |
| | Residual Strain | % | 41 | 23 | 31 | 32 | 36 | 35 |
| | Reduction of Outflow Starting Temperature after Retention | °C. | 3 | 3 | 4 | 18 | 11 | 4 |
| | Breaking Strength Retention Rate | % | 86 | 87 | 92 | 53 | 68 | 85 |
| | Tear Strength Retention Rate | % | 87 | 89 | 91 | 40 | 61 | 84 |
| | Initial Color Phase | b* | 1.3 | 1.4 | 1.2 | 3.8 | 1.1 | 3.8 |
| | Resistance to Discoloration by UV | Δb | 1.1 | 1.0 | 0.9 | 4.3 | 1.2 | 4.1 |
| | Fish Eye | Piece | 3 | 8 | 24 | 36 | 25 | 28 |

| | | | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|
| | Polyurethane Resin | | T | U | V | W | X | Y | Z |
| | Isocyanate Group-Terminated Polyurethane Prepolymer | | a | a | a | a | p | p | p |
| | 1,4-BD (parts by mass to 100 parts by mass of Prepolymer) | | 6.0 | 6.0 | 6.0 | 6.0 | 6.0 | 6.0 | 6.0 |
| | Equivalent Ratio (NCO/OH) | | 1.01 | 1.01 | 1.01 | 1.01 | 1.01 | 1.01 | 1.01 |
| | Concentration of Hard Segment (HS Concentration) | mass % | 18 | 18 | 18 | 18 | 18 | 18 | 18 |
| | Heat Treatment Temperature | °C. | 80 | 80 | 23 | 120 | 80 | 23 | 80 |
| | Heat Treatment Period | Day | 2 | 14 | 14 | 2 | 7 | 7 | 2 |
| Properties | T$_1$ (Calculation Value) | °C. | 114 | 114 | 114 | 114 | 114 | 114 | 114 |
| | T$_2$ (Calculation Value) | °C. | 174 | 174 | 174 | 174 | 174 | 174 | 174 |
| | Aggregation Temperature (Measured Value) | °C. | 105 | 110 | 108 | 109 | 140 | 111 | 109 |
| | Bismuth Catalyst Content (/Polyurethane Resin) | ppm | 0.94 | 0.94 | 0.94 | 0.94 | — | — | — |
| | Tin Catalyst Content (Polyurethane Resin) | ppm | — | — | — | — | 9.43 | 9.43 | 9.43 |
| Evaluation | Tear Strength | kN/m | 96 | 97 | 95 | 93 | 115 | 113 | 119 |
| | Breaking Strength | MPa | 26 | 27 | 29 | 25 | 37 | 35 | 34 |
| | Breaking Elongation | % | 520 | 500 | 580 | 520 | 650 | 620 | 660 |
| | Rebound Resilience | % | 68 | 67 | 68 | 69 | 73 | 72 | 71 |
| | Compression Permanent Set | % | 41 | 39 | 41 | 41 | 36 | 35 | 36 |
| | Residual Strain | % | 35 | 34 | 35 | 35 | 26 | 27 | 28 |
| | Reduction of Outflow Starting Temperature after Retention | °C. | 9 | 3 | 9 | 4 | 7 | 10 | 9 |
| | Breaking Strength Retention Rate | % | 65 | 88 | 65 | 86 | 83 | 67 | 70 |
| | Tear Strength Retention Rate | % | 48 | 87 | 56 | 84 | 81 | 64 | 66 |
| | Initial Color Phase | b* | 1.2 | 3.1 | 1.2 | 3.2 | 2.6 | 2.2 | 2.3 |
| | Resistance to Discoloration by UV | Δb | 1.2 | 3.2 | 1.0 | 2.9 | 2.5 | 2.1 | 2.0 |
| | Fish Eye | Piece | 29 | 21 | 23 | 33 | 5 | 26 | 21 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The method for producing a polyurethane resin, the polyurethane resin, and the molded article of the present invention are industrially widely used in various industrial fields.

The invention claimed is:

1. A method for producing a polyurethane resin comprising:
a reaction step of obtaining a primary product by reacting a polyisocyanate component containing a bis(isocyanatomethyl)cyclohexane with a polyol component containing a low molecular weight polyol having a number average molecular weight of 400 or less and a high molecular weight polyol having an average molecular weight of 2500 or more and 4000 or less under the presence of a bismuth catalyst, and
a heat treatment step of heat treating the primary product to obtain a polyurethane resin, wherein
the bismuth catalyst content in the polyurethane resin is 0.1 ppm or more and 1000 ppm or less, and
the heat treatment conditions in the heat treatment step are 50° C. or more and 100° C. or less and three days or more and ten days or less.

2. The method for producing a polyurethane resin according to claim 1, wherein
the bis(isocyanatomethyl)cyclohexane is a 1,4-bis(isocyanatomethyl)cyclohexane, and
the 1,4-bis(isocyanatomethyl)cyclohexane contains a trans-isomer at a ratio of 70 mol % or more and 99 mol % or less.

3. A polyurethane resin being:
a reaction product of a polyisocyanate component containing a 1,4-bis(isocyanatomethyl)cyclohexane with a polyol component containing a low molecular weight polyol having a number average molecular weight of 400 or less and a high molecular weight polyol having a number average molecular weight of 2500 or more and 4000 or less;
the bismuth catalyst content is 0.1 ppm or more and 1000 ppm or less; and
an aggregation temperature thereof measured with a differential scanning calorimeter is an aggregation temperature $T_1$ or more of a hard segment phase shown by the following calculation formula and
an aggregation temperature $T_2$ or less of a hard segment phase shown by the following calculation formula Aggregation temperature $T_1$ of hard segment phase (unit: ° C.): 100+0.75×concentration of hard segment (mass %)

Aggregation temperature $T_2$ of hard segment phase (unit: ° C.): 160+0.75×concentration of hard segment (mass %).

4. A molded article containing the polyurethane resin according to claim 3.

* * * * *